United States Patent Office 2,836,003
Patented May 27, 1958

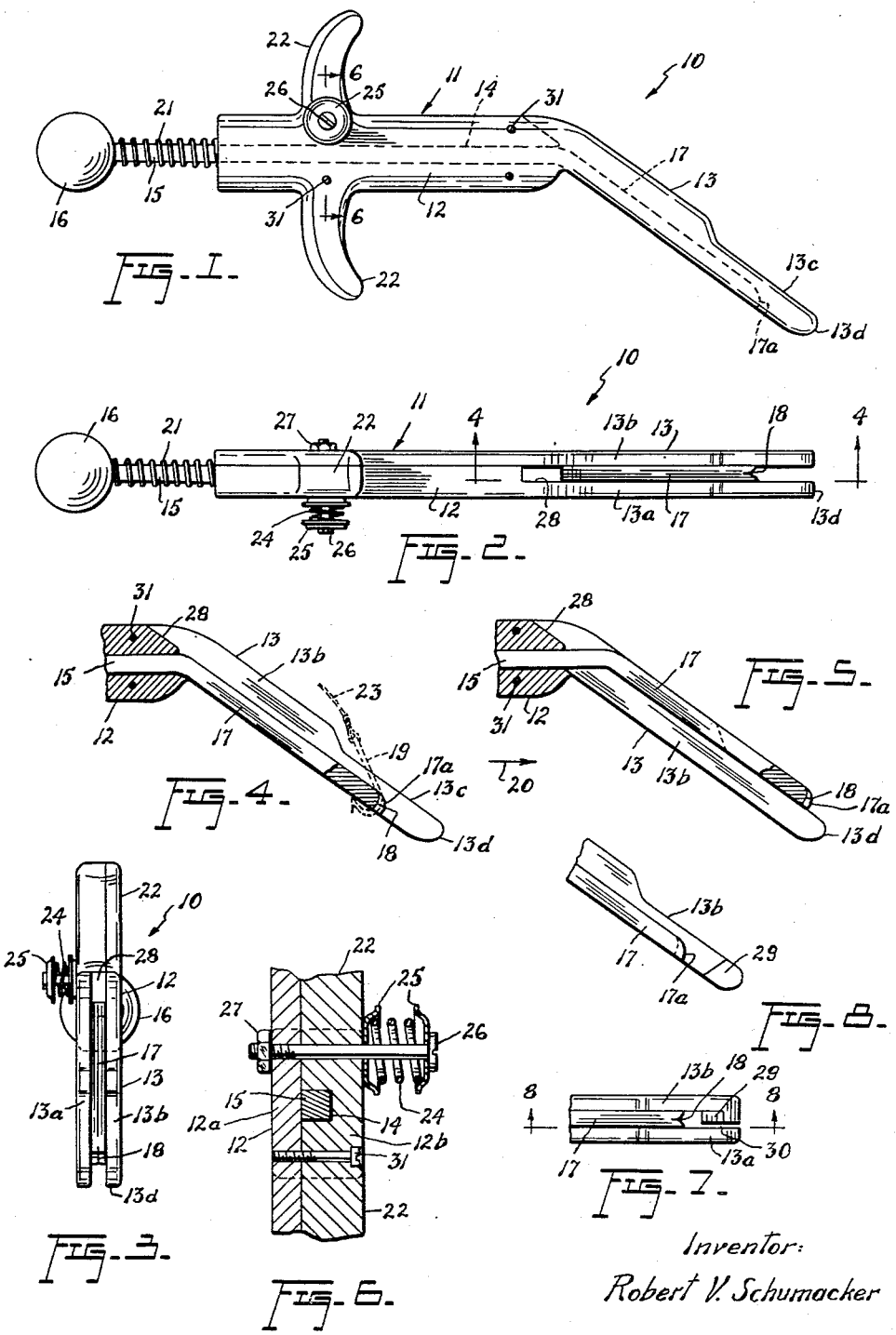

2,836,003

FISH HOOK EXTRACTORS

Robert V. Schumacker, Kansas City, Kans.

Application October 7, 1955, Serial No. 539,074

2 Claims. (Cl. 43—53.5)

This invention relates to new and useful improvements and structural refinements in fish hook extractors, and the principal object of the invention is to facilitate convenient and highly efficient removal of a fish hook from the mouth or body of a fish.

As is well known, when a fish is caught on a hook, the point of the hook penetrates the flesh of the fish in a direction from the inside toward the outside of the mouth, that is, in a direction opposite to that in which the hook entered when swallowed. Thus, any effort to remove the hook by pulling on the associated fishing line causes the hook to become even more firmly embedded, with the result that in many instances the fish is badly multilated before the hook can be removed.

The instant invention eliminates the above mentioned disadvantage by facilitating extraction of the hook from the same direction and angle in which it entered, whereby the hook may be quickly and easily removed without mutilating the fish.

Some of the advantages of the invention reside in its simplicity of construction, ease of operation, in its durability and in its adaptability to economical manufacture.

With the foregoing more important objects and features in view and such other objects and features as may become apparent as this specification proceeds, the invention resides in the arrangement of parts and details of construction substantially as shown in the accompanying drawing, wherein like characters of reference are used to designate like parts and wherein:

Figure 1 is a side elevational view of the invention;

Figure 2 is a top plan view thereof;

Figure 3 is a front end view of the same;

Figure 4 is a fragmentary sectional view, taken substantially in the plane of the line 4—4 in Figure 2 and showing the hook engaging bar in its retracted position;

Figure 5 is a fragmentary sectional view, similar to that shown in Figure 4 and illustrating the hook engaging bar in its projected position;

Figure 6 is a sectional detail on an enlarged scale, taken substantially in the plane of the line 6—6 in Figure 1;

Figure 7 is a fragmentary top plan view showing a slightly modified form of the invention; and Figure 8 is a sectional view, taken substantially in the plane of the line 8—8 in Figure 7.

Referring now to the accompanying drawing in detail, the fish hook extractor is designated generally by the reference numeral 10 and embodies in its construction an elongated body 11 including a handle member 12 and a bifurcated probe member 13 which is offset by an acute angle from the axis of the handle member, as shown.

The handle member 12 is provided with an axial bore or passage 14 having slidably disposed therein a plunger 15, the rear end of the plunger being equipped with a suitable hand knob 16 while the front end of the plunger is provided with an angularly offset extension bar 17. The angular relationship of the bar 17 to the plunger 15 is the same as that of the probe member 13 to the handle member 12, and when the plunger is in its retracted or rearwardly slid position as illustrated in Figures 1, 2 and 4, the bar 17 is disposed between the furcations 13a, 13b of the probe member 13.

It is to be noted that the forward end portions of the furcations 13a, 13b are reduced in width as indicated at 13c and terminate in rounded extremities 13d. Similarly, the forward end of the bar 17 terminates in a rounded extremity 17a provided with a kerf 18 to engage the bail portion of a fish hook 19.

When the plunger 15 is slid forwardly to its projected position as shown in Figure 5, the bar 17 is projected from between the furcations 13a, 13b in a direction parallel to the axis of the handle member 12, that is, in the direction of the arrow 20, so that when fully projected, the lower edge of the bar 17 lies substantially in the plane of the upper edges of the reduced portions 13c of the furcations.

The plunger 15 is urged to its retracted position by a compression spring 21 positioned on the plunger between the hand knob 16 and the adjacent end of the handle member 12, this spring being of such dimensions that when fully compressed it provides stop means for preventing the plunger and the bar 17 from being projected too far forwardly. A pair of suitable finger pieces 22 are provided on the handle member 12 to coact with the knob 16, whereby the device may be conveniently held and manipulated by only one hand. In other words, by grasping the finger pieces 22 with two fingers and engaging the knob 16 with the palm of the same hand, the plunger 15 may be slid to its projected position against the resiliency of the spring 21 and automatically retracted by the spring when pressure of the palm is relaxed.

Keeper means for the fishing line 23 associated with the hook 19 are provided on the handle member 12, these means comprising a compression spring 24 interposed between a pair of cupped washers 25 on a screw 26 extending transversely through the handle member 12, as is best shown in Figure 6. The screw is equipped with a nut 27 which may be adjusted so as to more or less compress the spring 24 and bring the washers 25 closer together or further apart. Moreover, the nut 27 may be removed and the screw 26 inserted from the opposite side into the handle member 12, whereby the line keeper means may be changed from one side of the handle member to the other, for the convenience of either left-handed or right-handed persons.

When the invention is placed in use, with the plunger 15 in its retracted position the kerf 18 of the bar 17 is engaged with the fishing line 23 and the device is manipulated so as to slide along the line through the mouth of the fish until the kerf 18 is engaged with the hook 19 as shown in Figure 4. The plunger 15 is then slid to its projected position, during which action the end 17a of the bar 17 will be projected laterally or obliquely from between the furcations of the probe member 13 to the position shown in Figure 5, whereby the fish hook will be removed from the flesh of the fish from the same direction and angle at which it entered because of the angular relationship of the elements 13, 17 with respect to the elements 12, 15, respectively. While the extracting operation is in progress, the line 23 may be frictionally engaged with the convolutions of the spring 24 to prevent the line from slipping and with the hook extracted from the flesh, the device may then be withdrawn from the mouth of the fish while keeping the plunger projected, so that the point of the fish hook is disposed between the furcations 13a, 13b and is protected thereby to safeguard against any possibility of the hook catching again.

If desired, the space between the furcations may be extended to form a slanting groove 28 in the forward portion of the handle member 12, through which the line 23 from the hook 19 may be passed to the keeper spring 24.

In the slightly modified form of the invention shown in Figures 7 and 8, the end portion of one of the furcations, for example, the furcation 13b, is provided with a block shaped element 29 disposed adjacent the end 17a of the bar 17, so that when the bar is projected with the hook 19 thereon, the hook is brought in abutment with the element 29 and is effectively stabilized thereby to prevent possible disengagement thereof from the kerf 18. A slight space as indicated at 30 is provided between the element 29 and the adjacent side of the furcation 13a to afford a passage for the fishing line, should it ever become necessary to pass the line through this region.

While the handle member 12 and the probe member 13 may be formed integrally, they are preferably composed of two, complemental sections as exemplified at 12a and 12b in Figure 6, which sections are secured together by a plurality of suitable pins or screws 31, as illustrated.

While in the foregoing there have been shown and described the preferred embodiments of the invention, various modifications may become apparent to those skilled in the art to which the invention relates. Accordingly, it is not desired to limit the invention to this disclosure, and various modifications may be resorted to, such as may fall within the spirit and scope of the appended claims.

What is claimed as new is:

1. A fish hook extractor comprising in combination, an elongated body including a handle member and a bifurcated probe member offset angularly from the axis of said handle member, a plunger slidable in the handle member between retracted and projected positions, and an angularly offset extension bar provided on said plunger and disposed between the furcations of said probe member when the plunger is retracted, said extension bar having a free end provided with a fish hook receiving kerf and being projectable laterally from between the furcations of the probe member in a direction parallel to the axis of said handle member when said plunger is projected.

2. The device as defined in claim 1 together with a fish hook abutting element provided on one of the furcations of said probe member, said element being disposed between said furcations adjacent the kerf in said bar.

References Cited in the file of this patent

UNITED STATES PATENTS

| | | |
|---|---|---|
| 2,294,758 | Manske | Sept. 1, 1942 |
| 2,537,879 | Culhane | Jan. 9, 1951 |
| 2,669,055 | Doerr | Feb. 14, 1954 |